United States Patent

[11] 3,584,714

| [72] | Inventor | Edward L. Ryswick |
| | | Rochester, N.Y. |
| [21] | Appl. No. | 855,913 |
| [22] | Filed | Sept. 8, 1969 |
| [45] | Patented | June 15, 1971 |
| [73] | Assignee | Tri-County Realty Corp. |
| | | Rochester, N.Y. |

[54] TORQUE-RESPONSIVE EXPANDIBLE CORE PLUG
15 Claims, 2 Drawing Figs.

[52] U.S. Cl.................................................. 192/54,
192/65, 192/74, 192/94, 242/72
[51] Int. Cl........................................................ F16d 43/21
[50] Field of Search............................................ 192/52, 54,
65, 74, 94; 64/29, 30, 30 D, 30 E; 242/72

[56] References Cited
UNITED STATES PATENTS

| 163,217 | 5/1875 | Lawson................... | 242/72 (X) |
| 2,066,659 | 1/1937 | Templeton et al........... | 242/72 |
| 2,140,255 | 12/1938 | Rieski...................... | 64/29 (X) |
| 2,380,308 | 7/1945 | Harstick................... | 192/54 (X) |
| 2,390,168 | 12/1945 | Piot......................... | 192/65 (UX) |
| 3,007,652 | 11/1961 | Heckman.................. | 64/30 (X) |

*Primary Examiner*—Allan D. Herrmann
*Attorney*—Cumpston, Shaw & Stephens

ABSTRACT: The inventive core plug for supporting hollow winding cores uses axial squeezing of elastomeric material to force it radially outward against the inside surface of the core, and makes the axial squeezing variable as a function of the torque applied to the winding core. This is accomplished by arranging rings of elastomeric material on a sleeve that is rotatable relative to a supporting shaft with the rings disposed between a fixed and an axially movable flange. A cam, inclined surface, or screw thread connection between fixed and movable parts accomplishes the desired axial movement of the flange for squeezing the rings as a function of the torque applied to the core.

PATENTED JUN 15 1971

3,584,714

INVENTOR.
EDWARD L. RYSWICK
BY Cumpston, Shaw
and Stephens
ATTORNEYS 3,584,714

TORQUE-RESPONSIVE EXPANDIBLE CORE PLUG

THE INVENTIVE IMPROVEMENT

Expandible core plugs for supporting hollow winding cores have used axial squeezing of elastomeric materials forced radially outward against the inside surface of the core, but such devices have required manual adjustment and operator attention. The invention involves recognition of the advantages of making such an expandible core plug torque responsive so that the squeeze on the elastomeric material and the resulting grip on the inside of the core is automatically made approximately proportional to the torque applied to the core in the winding process. This gives the plug a light grip on the core when only a few turns of web are wound on the core and torque is relatively low and a very forceful grip on the core when it carries many turns of web and torque is relatively high. The inventive torque-responsive core plug also aims at eliminating manual adjustment and preventing any slippage between the core plug and the core. The invention's objects also include a simple and economical core plug that is rugged, reliable and capable of long and accurate service.

SUMMARY OF THE INVENTION

One element fixed to a supporting shaft has a radially extending flange, and a rotatable sleeve on the shaft has another radially extending flange spaced from the fixed flange. An elastomeric ring is arranged on the sleeve between the fixed and rotatable flanges with the ring having an inside diameter approximately fitting the inside of the winding core. The sleeve and the fixed element are coupled so that rotation of the ring and sleeve relative to the fixed element and shaft moves the sleeve flange axially for axially squeezing the ring as a function of the torque applied to the ring core. The coupling between the sleeve and the fixed element is preferably a screw thread connection or a cam and follower arrangement.

DRAWINGS

FIG. 1 is a partially sectioned elevational view of a preferred embodiment of the inventive-torque-responsive expandible core plug; and FIG. 2 is a partially sectioned elevational view of another preferred embodiment of the inventive torque-responsive expandible core plug.

DETAILED DESCRIPTION

Figure 1:
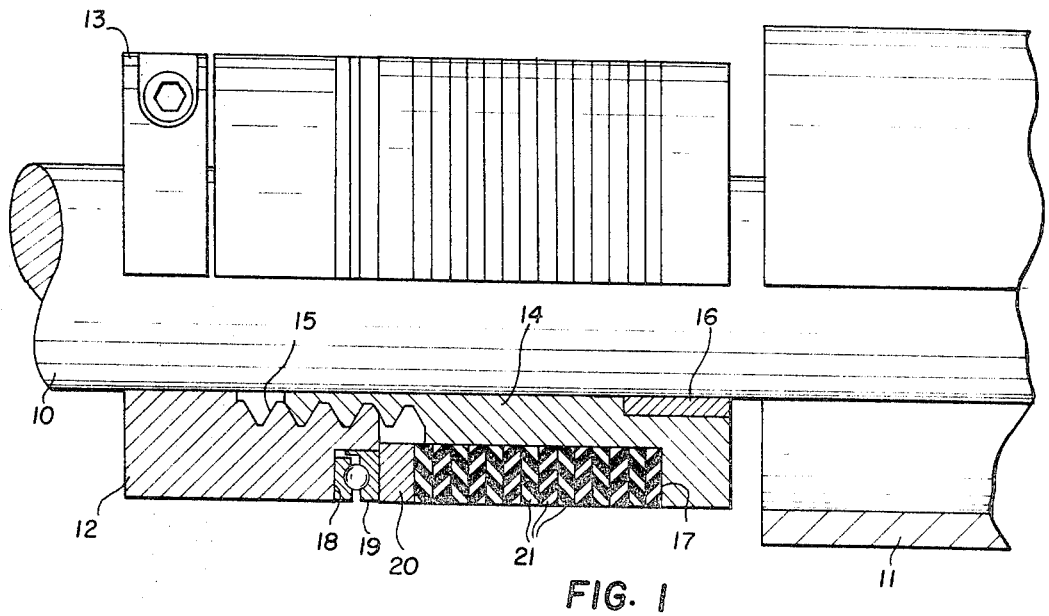

The torque-responsive core plug of FIG. 1 is arranged on a shaft 10 for gripping and supporting a paper winding core 11 such as used for the winding of paper, plastic, and foil webs. A fixed element 12 is secured to shaft 10 by clamp 13. A rotatable sleeve 14 is arranged for rotation on shaft 10, and sleeve 14 is coupled to fixed element 12 by screw threads 15. A bronze bushing 16 supports sleeve 14 for free rotation on shaft 10 so screw threads 15 can turn to draw sleeve 14 toward and away from fixed element 12.

Sleeve 14 has a radially extending flange 17 that is movable axially on shaft 10 as screw threads 15 are turned. Fixed element 12 has a radially extending flange 18 spaced from flange 17 on sleeve 14. A bearing ring 20 is fitted loosely over sleeve 14 and engages thrust bearing 19 between ring 20 and fixed flange 18.

A number of elastomeric rings 21 are arranged between bearing ring 20 and sleeve flange 17. The inside diameter of rings 21 approximately fits sleeve 14 so that rings 21 are carried snugly on sleeve 14. The outside diameter of rings 21 approximately fits the inside diameter or core 11 and is preferably slightly larger than the outside diameters of fixed element 12 and sleeve flange 17 so that core 11 can be slid over the core plug and into light engagement with the outside of rings 21.

Rings 21 can be formed of many elastomeric materials but are preferably rubber. Also, rings 21 can be formed in different sizes and thicknesses, and a single ring can be used, if desired. Rings 21 preferably extend axially for a distance sufficient for a firm engagement with the inside of core 11.

Axial squeezing of rings 21 between sleeve flange 17 and bearing ring 20 forces rings 21 radially outward to press against the inside of core 11. As torque is applied to core 11, it tends to turn rings 21 and sleeve 14, and screw threads 15 are oriented so that increasing the expected torque on core 11 drives screw threads 15 together for drawing flange 17 toward bearing ring 20 to increase the axial squeeze on rings 21 and increase the force of their radial engagement with the inside of core 11.

Figure 2:
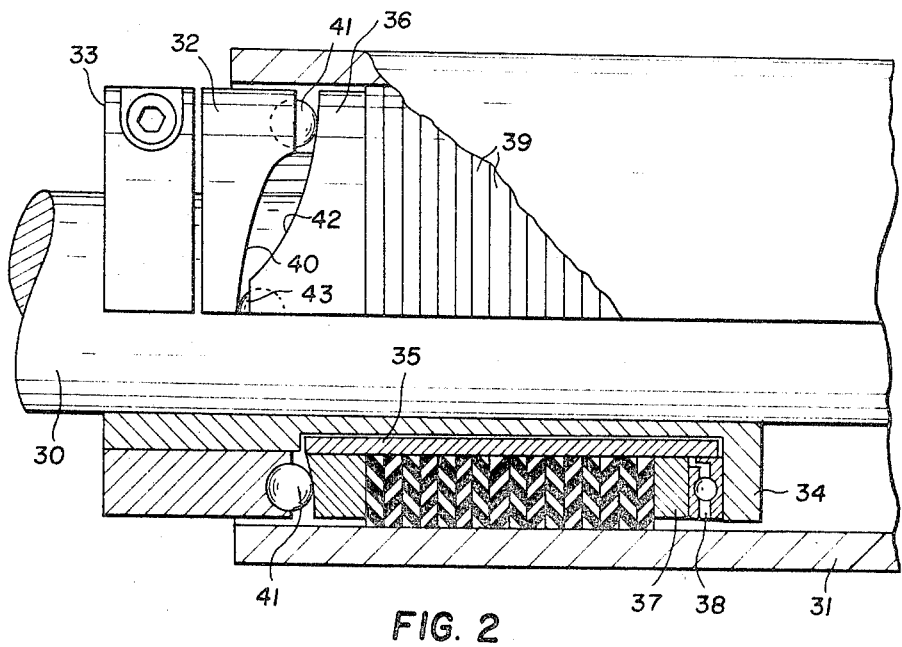

The torque-responsive expandible core plug of FIG. 2 is arranged on shaft 30 for engaging and supporting core 31. A fixed element 32 is secured to shaft 30 by clamp 33, and extends axially along shaft 30 to a fixed flange 34 that extends radially outward from shaft 30. Sleeve 35 is carried on fixed element 32 for rotation relative to shaft 30, and rotatable sleeve 35 includes a rotatable flange 36 that is axially movable on shaft 30. A bearing ring 37 carried on sleeve 35 engages a thrust bearing 38 arranged between fixed flange 34 and bearing ring 37. A plurality of elastomeric rings 39 are arranged on sleeve 35 between flange 36 and support ring 37, and elastomeric rings 39 perform the same function as elastomeric rings 21 of FIG. 1.

The axial movement of flange 36 for axially squeezing rings 39 is accomplished in a cam and follower arrangement in the embodiment of FIG. 2. Fixed element 32 has a cam surface 40 inclining toward diametrically spaced ball bearings 41 rotatably arranged in sockets at the high points of the cam surface 40. Flange 36 has a cam surface 42 preferably identically in shape to cam surface 40 and also inclining upward toward a pair of diametrically opposed ball bearings 43 arranged in sockets at the high points of cam surface 42. Ball bearings 41 and 43 reduce the friction of the engagement between the fixed and movable parts of the assembly and act as followers for respective cam surfaces 42 and 40.

As torque on core 31 turns rings 39 and sleeve 35 in either direction, ball bearings 41 and 43 move from their illustrated low-point positions up inclining cam surfaces 40 and 42 for forcing flange 36 toward fixed flange 34 to squeeze rings 39 and force them against the inside surface of core 31 as a function of the torque applied. The arrangement of FIG. 2 is preferred for core plugs responsive to torque in either direction so that the same core plug can be used in a driving or braking orientation without reversal on its shaft.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, other coupling devices including different cam and follower arrangements and different screw thread couplings between fixed and movable parts can be used for axially moving a flange to compress an elastomeric ring in response to applied torque. Also, different sleeves, ring configurations and other variations can be used as desired by those skilled in the art.

I claim:

1. A torque-responsive expandible core plug for rotationally supporting a hollow winding core, said plug comprising:
  a. a shaft;
  b. an element fixed to said shaft for rotation therewith;
  c. said fixed element including a radially extending flange;
  d. a sleeve around said shaft, said sleeve being rotatable relative to said shaft;
  e. said sleeve including a radially extending flange axially spaced from said fixed flange;
  f. an elastomeric ring arranged on said sleeve between said fixed and said rotatable flange;
  g. said ring having an inside diameter approximately fitting said sleeve;

h. said ring having an outside diameter approximately fitting the inside of said winding core; and i. means for coupling said sleeve and said fixed element so that rotation of said ring and sleeve relative to said fixed element and shaft moves said sleeve flange axially for axially squeezing said ring as a function of the torque applied to said ring by said core.

2. The core plug of claim 1 wherein said coupling means comprises a screw thread connection between said sleeve and said fixed element, said screw thread connection being oriented so that increasing said torque applied to said ring increases the axial squeeze on said ring.

3. The core plug of claim 1 including a bearing ring carried on said sleeve for engaging said fixed flange.

4. The core plug of claim 3 including a thrust bearing between said bearing ring and said fixed flange.

5. The core plug of claim 1 wherein said coupling means comprises a cam and follower.

6. The core plug of claim 5 wherein said cam is shaped so increasing said torque in either direction increases the axial squeeze on said ring.

7. The core plug of claim 5 wherein said follower includes a ball bearing and said cam includes an inclined surface engaged by said ball bearing.

8. The core plug of claim 7 wherein both said fixed element and said sleeve include said cam and said follower.

9. The core plug of claim 1 wherein said fixed element includes a cam member extending radially of said shaft in a region axially spaced from said fixed flange, said rotatable sleeve is arranged between said fixed flange and said cam member, and said sleeve flange bears against said cam member.

10. The core plug of claim 9 including a bearing ring carried on said sleeve for engaging said fixed flange.

11. The core plug of claim 10 including a thrust bearing between said bearing ring and said fixed flange.

12. The core plug of claim 9 wherein said cam member is shaped so increasing said torque in either direction increases the axial squeeze on said ring.

13. The core plug of claim 12 wherein said cam member includes ball bearings.

14. The core plug of claim 13 wherein said cam member includes inclined surfaces leading toward said ball bearings.

15. The core plug of claim 14 wherein said sleeve flange includes ball bearings and inclined surfaces leading towards said ball bearings for engaging said cam member.